(No Model.) 2 Sheets—Sheet 1.
A. F. REINHOLD.
BURNER.
No. 439,560. Patented Oct. 28, 1890.
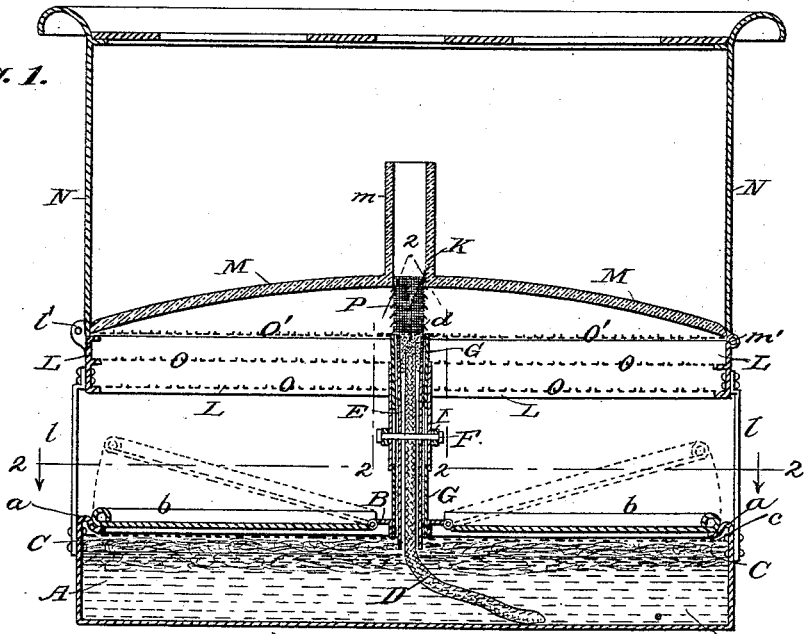
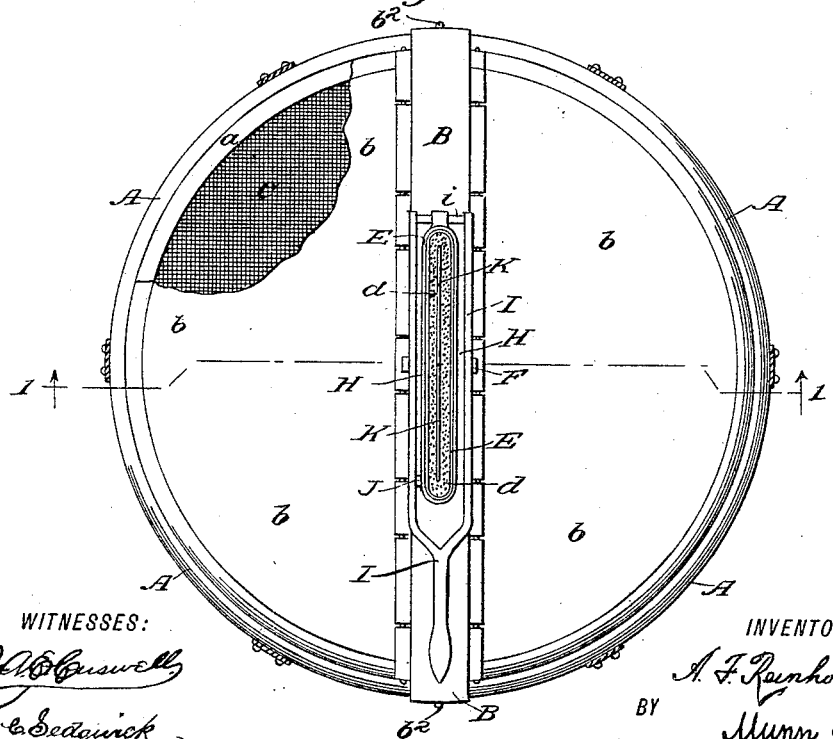
WITNESSES:
INVENTOR:
A. F. Reinhold
BY Munn &Co
ATTORNEYS.

(No Model.) 2 Sheets—Sheet 2.
A. F. REINHOLD.
BURNER.
No. 439,560. Patented Oct. 28, 1890.
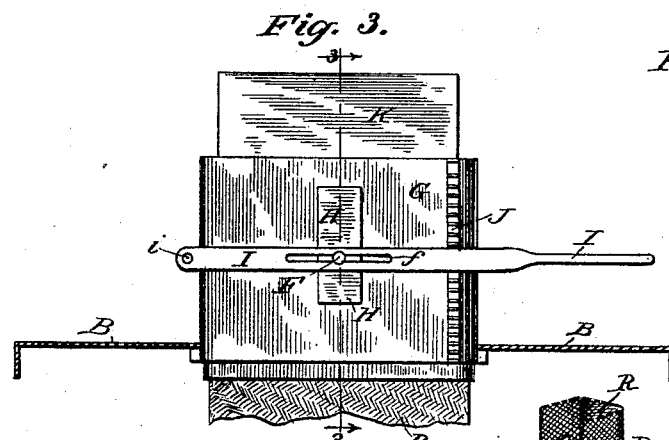
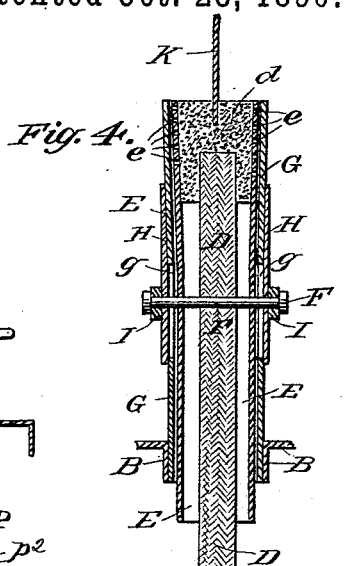
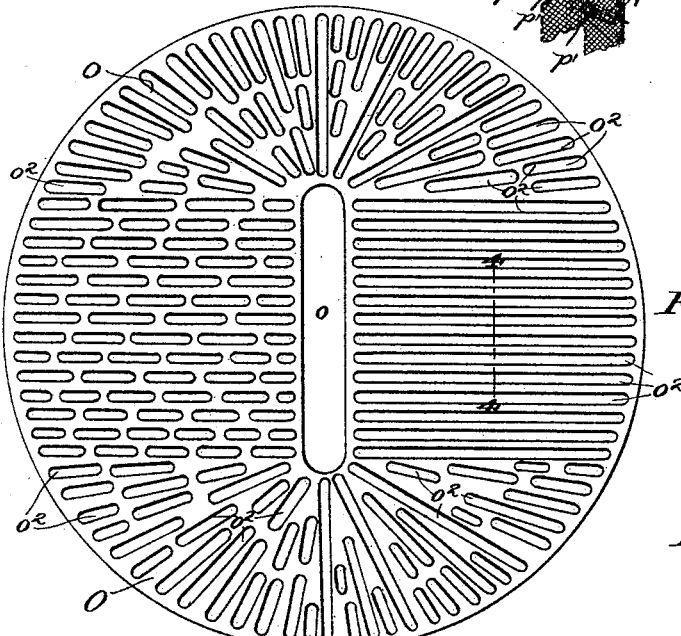
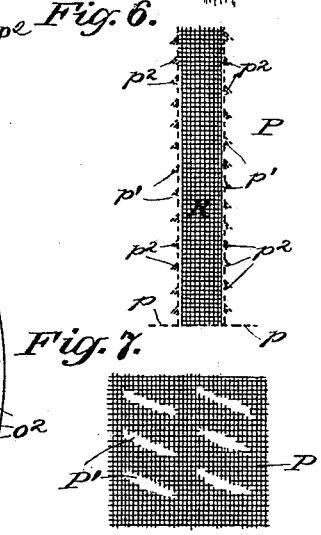
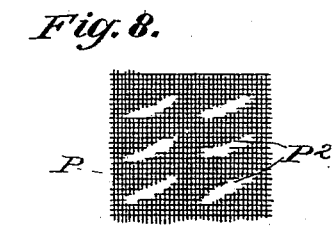
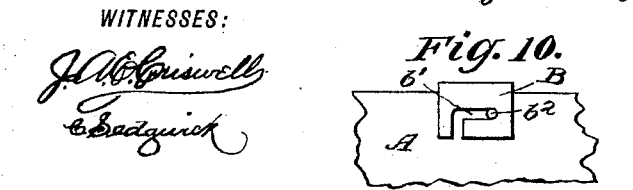
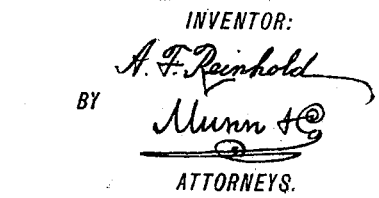
WITNESSES:
INVENTOR:
A. F. Reinhold
BY Munn & Co.
ATTORNEYS.

UNITED STATES PATENT OFFICE.

AUGUST F. REINHOLD, OF NEW YORK, N. Y.

BURNER.

SPECIFICATION forming part of Letters Patent No. 439,560, dated October 28, 1890.

Application filed May 8, 1889. Serial No. 310,018. (No model.)

*To all whom it may concern:*

Be it known that I, AUGUST F. REINHOLD, of the city, county, and State of New York, have invented new and useful Improvements in Burners, of which the following is a full, clear, and exact description.

My invention relates to burners adapted more particularly for burning oil for heating or lighting purposes; and the invention has for its object to provide a burner which is safe against disastrous explosion and is efficient and practically odorless.

The invention consists in certain novel features of construction and combinations of parts of the burner, all as hereinafter described and claimed.

Reference is to be had to the accompanying drawings, forming a part of this specification, in which similar letters of reference indicate corresponding parts in all the figures.

Figure 1 is a vertical sectional elevation of my improved burner, taken on the line 1 1 in Fig. 2. Fig. 2 is a plan view taken on the irregular line 2 2 2 2 2 in Fig. 1. Fig. 3 is a detail side view of the burner-wick and its supports. Fig. 4 is an enlarged vertical transverse section of the wick and adjacent parts, taken on the line 3 3 in Fig. 3. Fig. 5 is a plan view of one of the wick-tube-cooling and heating plates of the burner. Fig. 6 is an end view, and Fig. 6$^a$ a perspective view, of the mixing-chamber of the burner. Figs. 7 and 8 are inside face views of portions of opposite side walls of the mixing-chamber. Fig. 9 is an enlarged cross-section through a part of one of the wick-tube-cooling and air-heating plates, taken on the line 4 4 in Fig. 5; and Fig. 10 is a detail view showing the connection of the wick-tube bridge or support with the oil-fount.

The oil-fount A of the burner shown is made with a top consisting of a central transverse bridge plate or piece B, which supports the wick-tube and appurtenances hereinafter described, and two side covers $b\ b$, which are hinged to opposite edges of the bridge and close upon a marginal flange $a$ of the fount. Inside the fount is placed a loose filling or layer C of asbestus or other fiber, which floats upon the oil and prevents splashing of it from the fount, said filling being held within the fount by a wire-gauze plate $c$, fixed or placed under the marginal flange $a$, onto which the covers $b\ b$ close. I prefer to hold the bridge B to the fount, so that it may be readily removed from it with the covers or lids $b\ b$. I show the bridge provided in its down-bent ends with L-shaped slots $b'$, which are engaged with pins $b^2$, fixed in the fount, and form bayonet-joint connections of the parts. (See Figs. 2 and 10 of the drawings.) With this construction the lids $b\ b$ will be blown open should an explosion of the contents of the fount occur, and the lids in closing again by gravity would extinguish the burning oil in the fount and assure safety. The bridge and lids or covers may be removed together at any time for cleaning the fount, which may be filled with oil by pouring it directly through the gauze $c$ when either one of the lids $b$ is raised.

It will be understood that the gauze $c$ not only retains the asbestus fiber C in the fount should the lids open more or less, but it also operates as an auxiliary to the hinged lids or covers to prevent explosion. The lids $b\ b$ are shown raised in dotted lines in Fig. 1 of the drawings.

The wick D of the burner passes from the fount A up into a vertically-movable tube E, and a pin F, passed through both wick-tube and wick, holds both, so that they move up and down together. The pin F passes through slots $g\ g$, made in the opposite sides of an exterior tube G, which is fixed at its lower end to the bridge B of the fount. To the pin F are also held a couple of guard-plates H H, which lie closely to the sides of the exterior tube G and always cover its slots $g\ g$, however the inner wick-tube and wick may be adjusted, thus preventing escape of odors from the lamp-fount through these slots. I may move the wick-tube E by any suitable device, that shown being a lever I, which is fulcrumed at $i$ to the fixed tube G, and is forked around it and over the guard-plates H H, and has slots $f$, which engage the opposite ends of the pin F, and near its free end the lever works along a rack J on the tube G, with any tooth of which rack the lever may be engaged to hold the wick-tube E and wick D at any required vertical adjustment. Fig. 4 of the drawings shows that the upper portions of the tubes E G taper downward, so that when the tube E, with its wick D, is fully lowered an air-tight joint will be made between the two tubes to prevent escape of disagreeable odors from the oil in the fount into the room. The upper end of the wick D carries or enters a porous refractory cap or tip $d$, which allows feed of oil to the point of ignition and is practically indestructible by the flame, and the top of the wick-tube E, into which the tip is snugly fitted, is provided with numerous perforations $e$ for passage of air to the tip to maintain a bright strong flame at the point of ignition of the burner. As the wick-top is practically indestructible, the wick does not need trimming.

Into the center of the indestructible wick-tip $d$ is fixed a thin plate K, of metal or other refractory substance, which extends for quite the full width of the wick and projects sufficiently above the tip to divide the flame into halves and form a partition or barrier, which prevents the flame from being blown about sidewise by drafts and assures a steady solid body of flame, which gives off great heat without producing the disagreeable smells which arise from burners not provided with this flame-steadying partition or plate.

The head or top portion of the burner consists of a rim L, which is sustained by a series of standards $l$ a short distance above the oil-fount, and is provided with an upwardly-concaved top M, which has a central flue or chimney $m$ directly above the wick-tube and wick of the burner, which flue preferably has the same transverse form as the exterior fixed tube G. This top M may be held to the rim L in any suitable manner, but preferably by a hinge-joint at $m'$ and an opposite latch-bolt or other fastening device $l'$. (See Fig. 1 of the drawings.) The top, with its chimney, is preferably made in one piece of earthenware or vitreous or other substance which will take up or absorb as little as possible of the heat from the burner. When the burner is to be used with a stove, a drum N will be provided above the burner-top M $m$, and may be connected thereto in any preferred manner. This drum serves to support cooking-vessels of any kind to be used over the burner.

I provide one or more heat-absorbing and air-heating plates or diaphragms at the top of the burner. Two of these plates O O are sustained by flanges or otherwise within the rim L, and have central openings $o$ fitting loosely around the top of the burner, and a third or upper plate O' is held to the burner-top M, and will be thrown over with it on its hinge $m'$. To the top M and at its flue $m$ is fixed the upper end of a tubular casing P, made, preferably, of perforated metal or wire-gauze, and fixed at its lower end to the plate O' and around the margin of a central opening thereof, through which the burner-flame-dividing plate K passes upward within the casing P, the interior of which forms a mixing-chamber R, wherein heated air commingles with the oil-vapors at the point of ignition of the burner. The tube P being held to the plate O' and to or in the top flue $m$ will be raised or removed from the top plate M of the burner.

The plates O O O' are made substantially alike, and as most clearly shown in Figs. 5 and 9 of the drawings. Each plate is stamped out of sheet metal or other substance which is incombustible, and is provided with a central opening at or above the burner-wick tube, and throughout its entire body portion is formed with a series of slots $o^2$, formed by pressing up the metal plate without removing any of it, thereby providing upwardly-projecting flanges $o^3$ around each of the slots, said flanges forming short flues or chimneys through which air entering the burner above the oil-fount and between the standards $l$ may pass freely upward. The plate-slots $o^3$ are preferably made radial, and may either be short or long, as Fig. 5 of the drawings shows. The flanges $p$ at the bottom of the tubular casing P, and shown in Fig. 6 of the drawings, provide for fastening this casing by rivets or otherwise to the top plate O' of the burner.

The tubular casing P is preferably made of perforated metal provided at opposite sides with series of slots $p'$, provided by punching the metal outward from its inside face without removing any of it, thereby forming over the slots so made a series of hoods $p^2$, (see Fig. 6$^a$,) which incline downward from the tops of the slots and catch the upwardly-moving hot-air currents which had passed through the plates O O' and conduct them to the mixing-chamber R within the tube.

Figs. 7 and 8 of the drawings, which are inside face views of opposite sides of the mixing-chamber casing or wall, show that the slots and hoods $p'$ $p^2$ range laterally of the casing and incline diagonally in opposite directions, thereby causing the hot air passing through the slots to have diverse directions as it enters the mixing-chamber R to more thoroughly commingle with the oil-vapors therein to promote perfect combustion.

In using the burner its top M will be swung upward on the hinge $m'$ and the lever I will be operated to raise the wick-tube E and the wick D $d$, and the burner will be lighted at the tip, and the top M will then be lowered and fastened. By operating the lever I the wick may be adjusted vertically to produce a larger or smaller flame, and the tube E and wick may also be lowered sufficiently within the relatively-fixed tube G to extinguish the light. When the light is burning, the plates O O O' will take up much heat from the wick-tubes and thereby keep them cooler, and this heat will be utilized to heat the air which passes through the slots $o^2$ of the plates to the top plate M, which by its concaved or dished form leads all the heated air inward to the casing P, through which the hot air passes to the mixing-chamber R next or at the flame to maintain combustion at a very high temperature and with economical consumption of oil. The hot products escape through the flue $m$ of the top plate of the burner.

In so far as some features of my invention, hereinafter set forth, are concerned it is immaterial whether the burners have a wick for burning oil or be made with any suitable tip or flaming-point for burning gas or other fluid.

Having thus described my invention, what I claim as new, and desire to secure by Letters Patent, is—

1. The combination, with the oil-fount, the tube G, slotted at $g$, the tube E, the wick D therein, and the pin F, passing through the parts E D and slots $g$, of guard-plates H on the pin at the slots, substantially as herein set forth.

2. The combination, with the oil-fount, the tubes G E, wick D, and pin F, of the lever I and a detent therefor, substantially as herein set forth.

3. The combination, with the oil-fount, of the fixed tube G and an inner adjustable wick-carrying tube E, said tubes being made tapering to assure a tight joint between them when the tube E is lowered, substantially as herein set forth.

4. The combination, with the oil-fount and a tube fixed thereto, of a vertically-adjustable tube held within the fixed tube and having a laterally-perforated upper portion, a fibrous wick held within said adjustable tube and the fount, and an indestructible tip fitted in the adjustable tube within its upper perforated part and around the upper end of the fibrous wick, substantially as herein set forth.

5. A burner provided with a refractory or non-conducting concaved or dished and apertured plate above the flame and one or more perforated heat absorbing and radiating plates held below said top and around the wick-tube or flaming-point, substantially as described, for the purposes set forth.

6. In a burner, the combination, with the wick-tube or flaming-point, of one or more heat-conducting plates O, provided with slots $o^2$, having marginal flanges $o^3$, substantially as herein set forth.

7. The combination, in a burner and with its wick-tube or flaming-point, of an upper rim L, one or more perforated plates O, held thereto, an upper refractory concaved top M, held to the rim L and having an opening at $m$, a perforated plate O', held to the top M, and a tube or casing P, held to the parts M O' and forming a mixing-chamber R at the point of ignition of the burner, substantially as herein set forth.

8. In a burner, the combination, with the wick-tube or flaming-point, of a tube or casing located above the wick-tube and forming a mixing-chamber and provided at its side walls with hooded slots or openings, substantially as herein set forth.

9. In a burner, the combination, with the wick-tube or flaming-point, of a tube or casing P, providing a mixing-chamber and provided in its opposite sides with reversely-inclined hooded slots or openings, substantially as herein set forth.

AUGUST F. REINHOLD.

Witnesses:
HENRY L. GOODWIN,
C. SEDGWICK.